United States Patent [19]

Rhoades, Jr.

[11] Patent Number: 4,574,754

[45] Date of Patent: Mar. 11, 1986

[54] STRATIFIED CHARGE COMBUSTION SYSTEM AND METHOD FOR GASEOUS FUEL INTERNAL COMBUSTION ENGINES

[76] Inventor: Warren A. Rhoades, Jr., 4007 Crow Valley Dr., Missouri City, Tex. 77459

[21] Appl. No.: 659,679

[22] Filed: Oct. 11, 1984

Related U.S. Application Data

[63] Continuation-in-part of Ser. No. 408,411, Aug. 16, 1982, abandoned.

[51] Int. Cl.$^4$ ............................................. F02B 23/08
[52] U.S. Cl. ............................ 123/298; 123/193 CH; 123/188 AF; 123/188 VA; 123/DIG. 4
[58] Field of Search ............... 123/430, 294, 295, 298, 123/299, 260, 188 VA, 188 AA, 188 AF, 188 M, DIG. 4, 12

[56] References Cited

U.S. PATENT DOCUMENTS

| | | | |
|---|---|---|---|
| 880,704 | 3/1908 | Wood. | |
| 3,154,059 | 10/1964 | Witzky et al. | |
| 3,318,292 | 5/1967 | Hideg. | |
| 3,809,039 | 5/1974 | Alquist. | |
| 3,878,825 | 4/1975 | Klomp | 123/188 M |
| 3,911,873 | 10/1975 | Dave | 123/188 AF |
| 3,919,984 | 11/1975 | Yagi et al. | |
| 3,980,059 | 9/1976 | Noguchi et al. | 123/188 VA |
| 4,036,202 | 7/1977 | Weslake. | |
| 4,058,091 | 11/1977 | Tanahashi | 123/188 VA |
| 4,075,994 | 2/1978 | Mayer et al. | |
| 4,187,825 | 2/1980 | Loyd, Jr. | |
| 4,210,104 | 7/1980 | Nakamura et al. | |
| 4,253,433 | 3/1981 | Blair. | |
| 4,305,358 | 12/1981 | Nakamura et al. | 123/26 |
| 4,309,969 | 1/1982 | Matthes. | |
| 4,320,725 | 3/1982 | Rychlik et al. | 123/188 AF |
| 4,340,019 | 7/1982 | Barnert et al. | 123/260 |
| 4,344,390 | 8/1982 | Heydrich et al. | 123/193 CH |
| 4,355,604 | 10/1982 | Chaibongsai | 123/188 VA |

FOREIGN PATENT DOCUMENTS

| | | | |
|---|---|---|---|
| 0869305 | 4/1971 | Canada | 123/DIG. 4 |
| 0847229 | 7/1949 | Fed. Rep. of Germany | 123/298 |
| 0217310 | 2/1942 | Switzerland | 123/298 |

OTHER PUBLICATIONS

"Directional Fuel Injection-2 Cycle Natural Gas Engines", E. H. Clements, ORSA/TIMS Meeting at Houston, Tex., Oct. 1981.

Fairbanks Morse M.E.P. product brochure entitled "Engines for the Oil and Gas Industry", Jul. 80.

"A Stratified Charge Multifuel Military Engine—A Progress Report" by E. Mitchell, et al., pp. 1-9, Jun. 70.

"A New Concept of Stratified Charge Combustion—The Ford Combustion Process (FCP)" by I. Bishop et al., pp. 93-117, May 68.

1982 Society of Automotive Engineers, Inc., "Single--Cylinder Axial Stratified Charging Studied", pp. 67-71, Apr., 1982.

1982 Society of Automotive Engineers, Inc., "Multi--Cylinder Axial Stratified Charging Studied", pp. 67-72, May 1982.

(List continued on next page.)

Primary Examiner—Parshotam S. Lall
Attorney, Agent, or Firm—Arnold, White & Durkee

[57] ABSTRACT

A stratified charge combustion system is disclosed for use in a gaseous fuel internal combustion engine. The stratified charge combustion system comprises a combustion chamber, an ignition source in communication with the combustion chamber, and a gaseous fuel injection valve assembly in communication with the combustion chamber and in spaced relationship from the ignition source. An entry port for the gaseous fuel defined by the valve assembly is recessed outside the combustion chamber, and a transitional surface that curves away from the direction of fuel injection is located adjacent the entry port. When gaseous fuel is injected, it strikes the transitional surface at such an angle and speed that it clings to and follows the transitional surface under the Coanda Effect and then aerodynamically clings to and follows a wall of the combustion chamber as the gaseous fuel flows to the ignition source.

22 Claims, 13 Drawing Figures

OTHER PUBLICATIONS

1974 Society of Automotive Engineers "3-Valve Stratified Charge Engines: Evolvement, Analysis and Progression", pp. 1-24, Nov. 74.

1976 Society of Automotive Engineers "The Optimization of Body Details—A Method for Reducing the Aerodynamic Drag of Road Vehicles", pp. 1-18, Feb. 76.

"Scavenging and Other Problems of Two-Stroke Cycle Spark-Ignition Engines" by A. Jante, pp. 101-122, SAE, May 68.

Marks' Standard Handbook for Mechanical Engineers pp. 11-58 through 11-84, pp. 3-34 through 3-37, May 78.

SAE Technical Paper Series "An Experiment and Analytical Study of Flash-Boiling Fuel Injection" by R. D. Oza et al., Mar. 1983.

SAE Technical Paper Series "Analysis of Hydrocarbon Emissions Mechanisms in a Direct Injection Spark-Ignition Engine" by A. J. Giovanetti et al., Mar. 1983.

I Mech E Conference Publications, "A New Stratified Charge Engine Based on the Ricardo Comet Design", pp. 103-107, Nov. 76.

Article entitled "Applications of the Coanda Effect" by Imants Reba, Scientific America, May 1969.

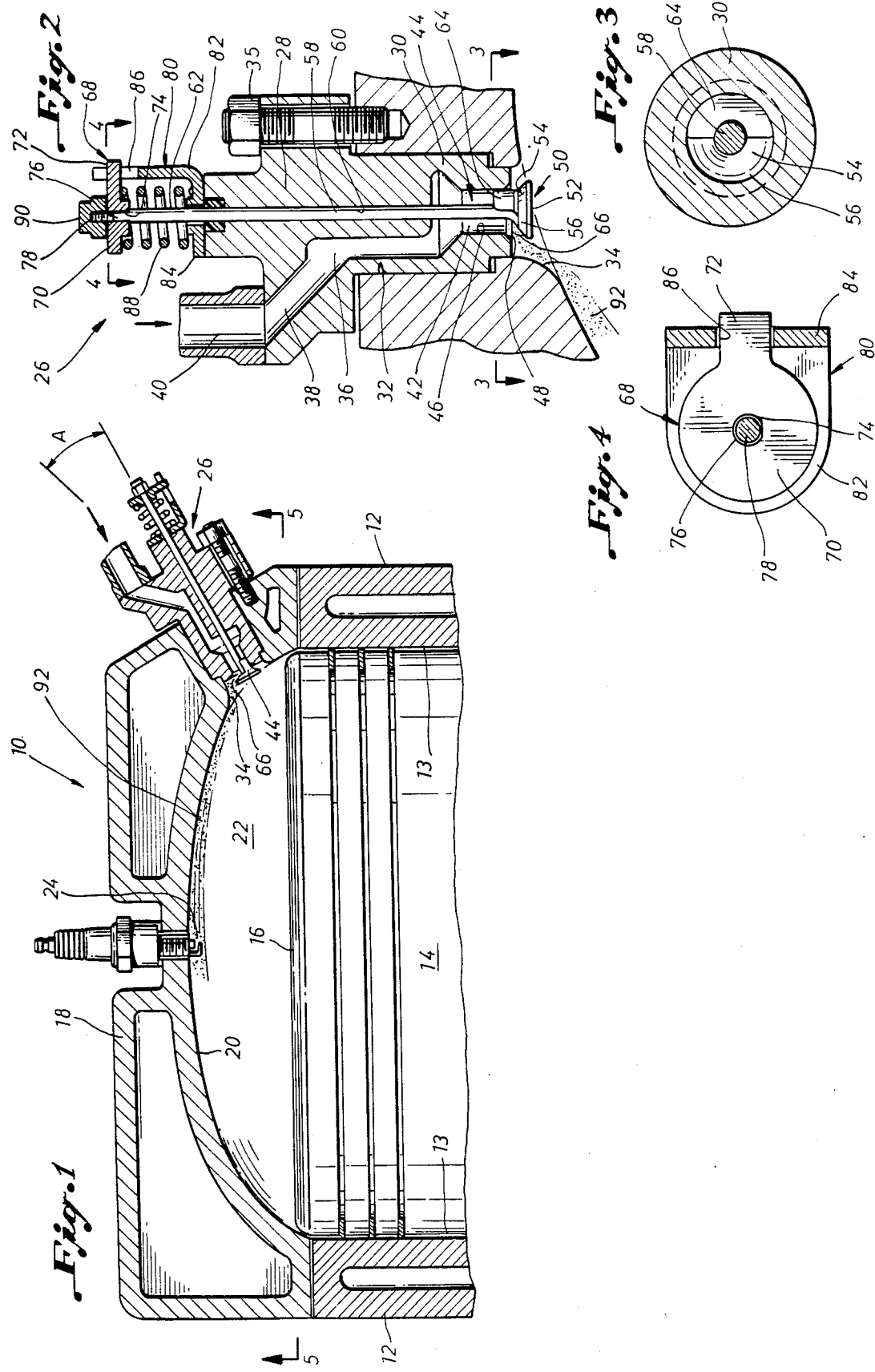

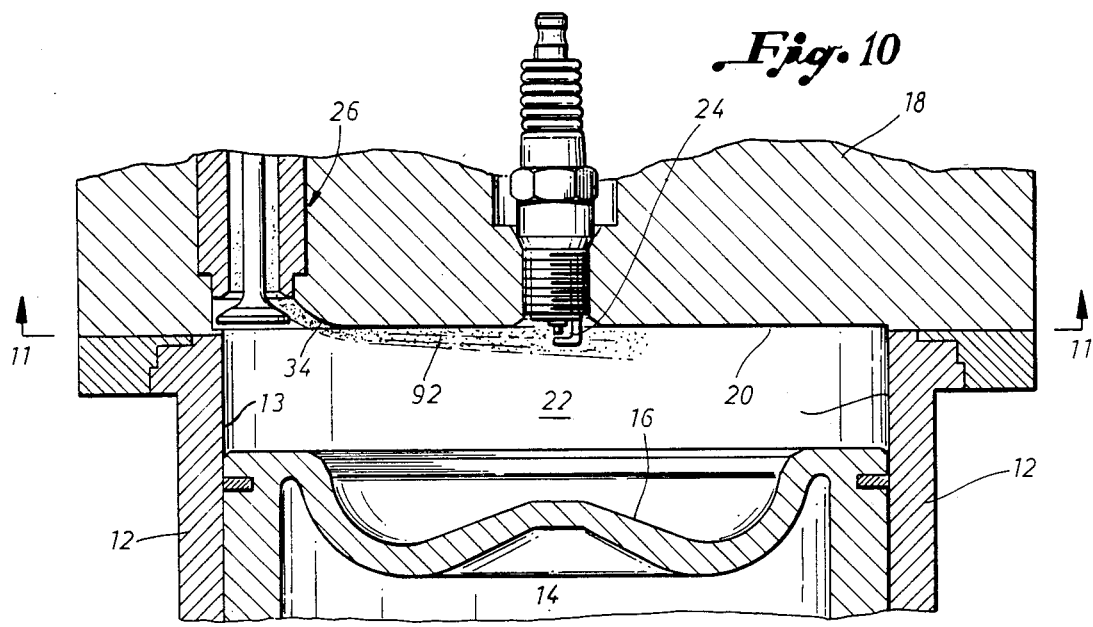
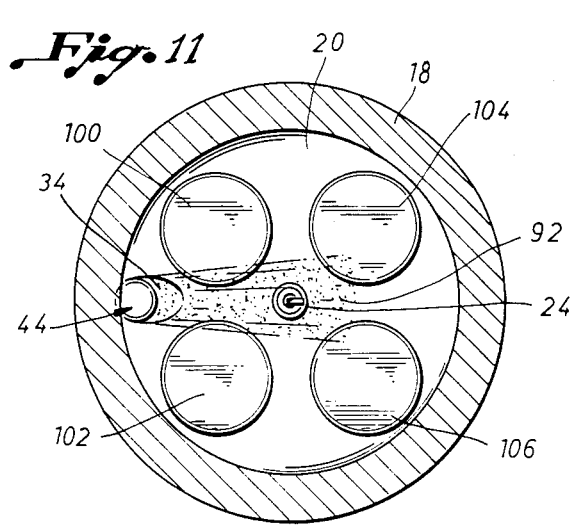
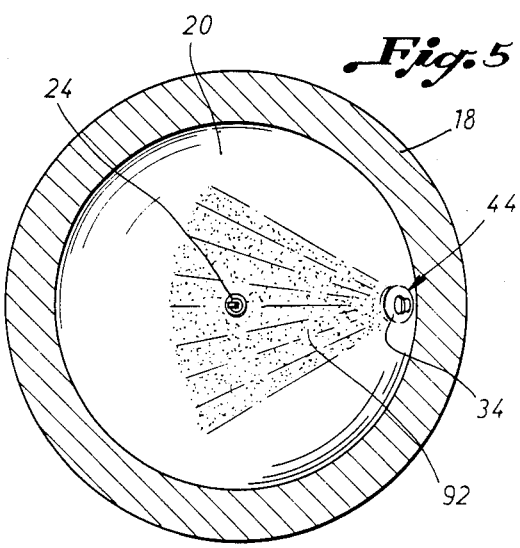
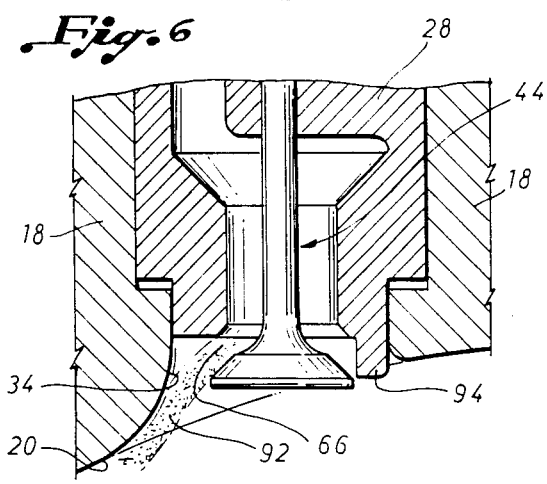
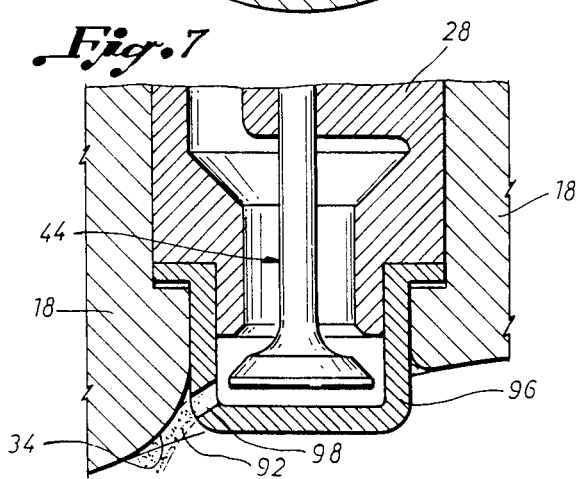

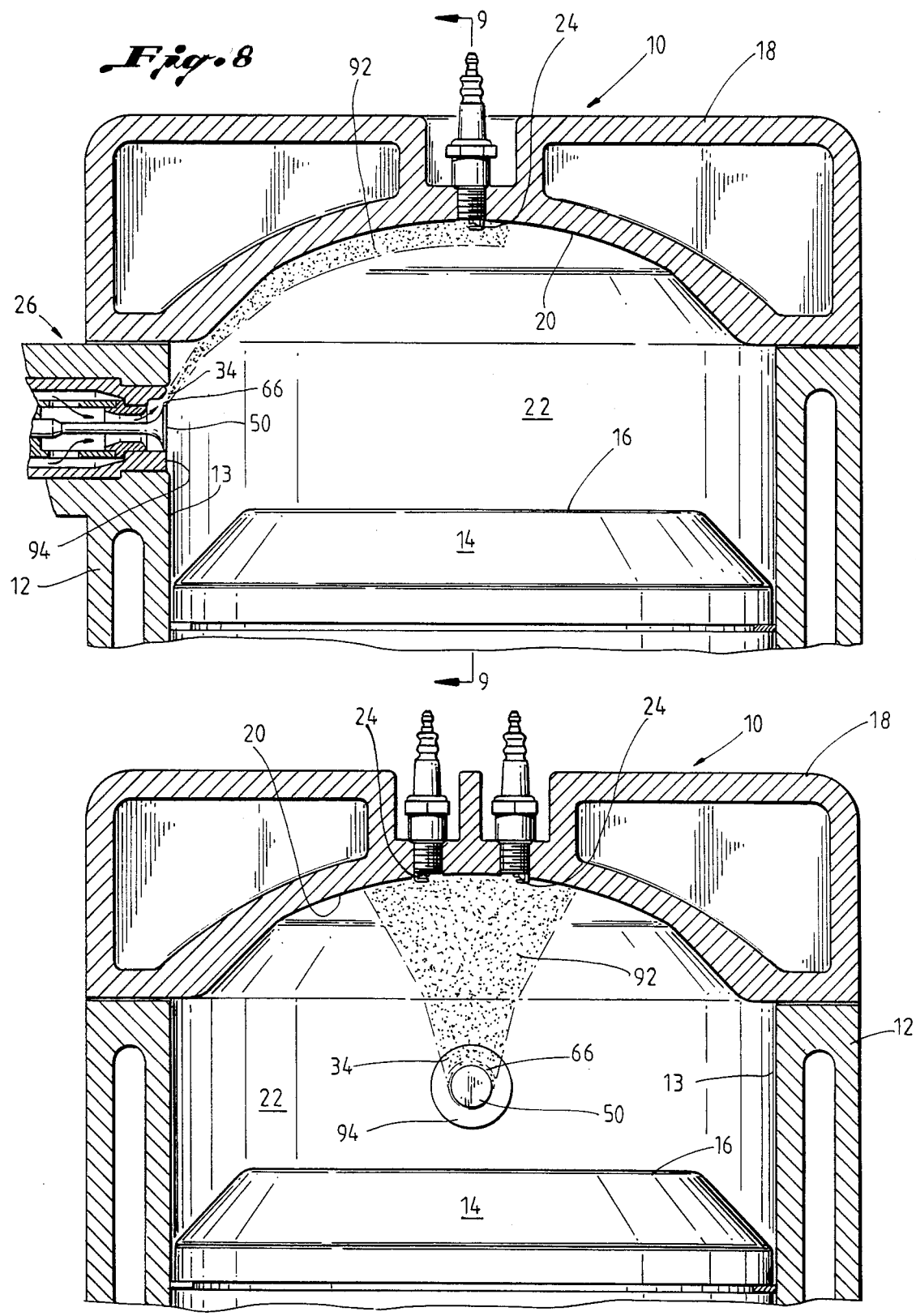

STRATIFIED CHARGE COMBUSTION SYSTEM AND METHOD FOR GASEOUS FUEL INTERNAL COMBUSTION ENGINES

RELATED APPLICATION

This application is a continuation-in-part of applicant's co-pending application Ser. No. 408,411, filed Aug. 16, 1982, now abandoned.

BACKGROUND OF THE INVENTION

This invention relates generally to gaseous fuel internal combustion engines. More particularly, this invention concerns a novel stratified charge combustion apparatus and method for use in such engines.

Conventional spark ignited internal combustion engines burn a homogeneous mixture of air and fuel supplied to the combustion chamber from a mixing device, such as a carburetor. To achieve ignition of this homogeneous mixture, the air-to-fuel ratio must be maintained within a relatively narrow range, which prevents optimum combustion of the air/fuel mixture over the full range of operating levels. For example, if the engine is operating at a low power output, the air intake must be throttled to reduce the amount of air taken into the combustion chamber, thereby maintaining the air-to-fuel ratio within the ignitable range. Throttling the air intake, however, results in increased friction horsepower and increased pumping losses, thereby reducing engine efficiency.

In contrast, by concentrating fuel in the vicinity of the ignition source, stratified charge internal combustion engines maintain the air-to-fuel ratio near the ignition source within the ignitable range. Combustion is thus possible in a stratified charge combustion system even though the overall air-to-fuel ratio may run well outside the ignitable limits. The resulting oxygen-rich environment of the combustion chamber produces more complete combustion of the fuel. The stratified charge combustion engine thus can run more efficiently and also exhausts less emissions than conventional internal combustion engines.

Additionally, because the air-to-fuel ratio is high in those portions of the combustion chamber remote from the ignition source, stratified charge combustion systems alleviate the problem of detonation. This permits the utilization of higher compression ratios compared to compression ratios of standard homogeneous mixture internal combustion engines. Higher compression ratios, in turn, yield lower fuel consumption, and thus will lower engine operating costs and conserve energy.

The advantages of stratified charge internal combustion have long been known and practiced in liquid fuel internal combustion engines. Different methods have been used to create a fuel rich mixture in the vicinity of the ignition source. For example, U.S. Pat. No. 3,318,292 to Hideg discloses various embodiments of a liquid fuel stratification charge system. Particularly, several of the described embodiments illustrate a liquid fuel injector that directs the liquid fuel against a wall of the combustion chamber where it is vaporized and subsequently transported to the ignition source by the turbulent motion of combustion air in the combustion chamber. In another embodiment, a liquid fuel is injected against at least one surface of an air intake port, intake passage, or intake valve where it is vaporized and carried into the combustion chamber by the incoming air.

Another method of creating liquid fuel charge stratification is shown in U.S. Pat. No. 3,911,873 to Dave. This method involves a variable internal combustion engine valve operating system, one embodiment of which illustrates a shrouded valve for directing the flow of a carbureted fuel/air mixture toward a spark plug.

A further example is shown in U.S. Pat. No. 3,154,059 to Witzky et al., which discloses an injection system in which liquid fuel is injected near the periphery and against the direction of swirling air in the combustion chamber to create a rich fuel/air mixture near the ignition source. Liquid fuel is directed against the cylinder head to evaporate it.

U.S. Pat. No. 3,809,039 to Alquist, also directed to stratified charge liquid fuel internal combustion engines, discloses a spark ignition system in which a rich fuel/air mixture is passed into a precombustion chamber where it is spark ignited. The ignited rich fuel/air mixture then induces ignition of a lean fuel/air mixture in the main combustion chamber.

In present commercial gaseous fuel internal combustion engines, the gaseous fuel is introduced into the combustion chamber in one of two ways. First, the combustion air and gaseous fuel may enter the combustion chamber together through either intake valves or intake ports. Second, the combustion air may be admitted separately through either intake valves or intake ports. The gaseous fuel is then separately injected into the combustion chamber by a gaseous fuel injection valve. Typically, the valve is non-directional; that is, the gaseous fuel is injected 360° around the valve, creating a roughly cone-shaped dispersion of the gaseous fuel in the combustion chamber. Occasionally, a directional fuel injection valve is used to inject the gaseous fuel at less than 180° around the valve.

Dual chamber combustion systems, illustrated by the Fairbanks Morse M.E.P. Model 8⅛ Spark Ignited Energy Cell Gaseous Fuel Engine, have been used in gaseous fuel internal combustion engines. A rich homogeneous fuel/air mixture is spark ignited in a precombustion chamber. This ignited rich fuel/air mixture then induces ignition of a lean fuel/air mixture in the main combustion chamber. This type of combustion system is sometimes referred to as a stratified charge system.

In all these commercially available gaseous fuel engines, however, the fuel injection system is designed to achieve a homogeneous mixture of the gaseous fuel and the combustion air in the main combustion chamber at the time of ignition. Even when a separate gaseous fuel injection valve is used, location of valves in the combustion chamber, the directional orientation of the valves, and the angle of the valves is designed to direct the gaseous fuel toward the center of the combustion chamber and/or into the mass of combustion chamber air. Thus, present gaseous fuel internal combustion engines possess many of the disadvantages of homogeneous charge liquid fuel internal combustion engines, including inefficient fuel comsumption, which results in higher fuel costs and produces greater amounts of air pollutants.

In summary, charge stratification has been successfully applied in commercial liquid fuel engines but not in commercial gaseous fuel engines. The charge stratification systems used in liquid fuel engines cannot be applied to gaseous fuel engines because of the extreme differences between gas behavior and liquid behavior.

The differences in gas and liquid behavior begin with the differences in their physical properties. Liquid and gas fluid characteristics are so different that they each have separate points of reference. Water is generally used as a reference for liquids, whereas air is used for gases. See Marks' Standard Handbook for Mechanical Engineers, p. $3 \propto 35$ (8th ed.). Viscosity of liquids is orders of magnitude greater than the viscosity of gases. Liquids have surface tension, and gases do not. Also, liquids have cohesion between their molecules and the ability to adhere to a surface, whereas gases do not. See Marks' Standard Handbook for Mechanical Engineers, pps. 3-36 to 3-37 (8th ed.).

These differences in properties have a direct impact on the art of fuel injection. Liquid fuels tend not to break up as they flow into the combustion chamber air. The liquid will stream through the air until it loses its velocity and impacts a solid surface. By contrast, a gaseous fuel will naturally tend to break up and immediately mix with the combustion air when it enters the chamber. The gaseous fuel is not able to penetrate the air mass to any great extent because of its low inertia (mass and velocity).

This ability of an injected liquid fuel to retain a defined jet while a gaseous fuel breaks up is graphically depicted in the Society of Automotive Engineers Technical Paper Series No. 830590 entitled "An Exprimental and Analytical Study of Flash-Boiling Fuel Injection", FIGS. 8 and 16 at pages 8 and 11.

Further, a liquid fuel will stick to a surface of the combustion chamber after impact because of its viscosity and surface tension characteristics. By contrast, a gas will not cling to a surface without the proper fluid dynamics of impact angle, surface contour, and speed to hold the gas on the surface.

A liquid fuel in its liquid state will not ignite or burn. By contrast, a gaseous fuel will ignite and burn. Therefore, liquid fuels must be vaporized before they can be ignited. See the Society of Automotive Engineers Technical Paper Series No. 830587 entitled "Analysis of Hydrocarbon Emissions Mechanisms in a Direct Injection Spark-Ignition Engine", FIG. 21, page 21. As previously mentioned, both U.S. Pat. No. 3,318,292 to Hideg and U.S. Pat. No. 3,154,059 to Witzky et al., both dealing with liquid fuel engines, teach the necessity for vaporization before ignition in a liquid fuel engine.

Although small droplets of a liquid can be carried in suspension in air, they will not mix with the air. Only after the liquid has been vaporized will it mix with air. Once a mixture is obtained, the vaporized fuel can be separated from the air only be reliquifying or condensing. By contrast, a gaseous fuel is already a vapor at injection and will immediately mix with the air in the combustion chamber.

Finally, the energy content of a given volume of liquid fuel is many times greater than the energy content of an equal volume of gaseous fuel. For example, a cubic foot of natural gas contains about 1,000 BTUs. A cubic foot of gasoline contains approximately 1,000,000 BTUs, a ratio of 1,000:1. Due to the extremely large differences in the energy content of a volume of liquid fuel as compared to a gaseous fuel, the actual volume of liquid fuel injected per combustion cycle is minute as compared to the large volume of gaseous fuel injected into an internal combustion engine of the same size and power. The difference in energy per volume between a liquid and a gaseous fuel is due to the weight per volume difference between the two types of fuels.

The liquid fuel, with its much higher weight per volume, can be pinpointed in its injection into the cylinder, since the volume of liquid is small relative to the volume of combustion air or the size of the cylinder. By contrast, gaseous fuel with its extremely low weight to volume ratio has a natural tendency to cover the total volume of the cylinder as it is injected.

Accordingly, the properties and resulting behavior of liquid and gaseous fuels are so divergent that injection of one into a combustion chamber is entirely different from injection of the other. For example, both U.S. Pat. No. 3,318,292 to Hideg and U.S. Pat. No. 3,154,059 to Witzky et al. teach directing the liquid fuel into the volume of the combustion chamber air and using the swirling motion of the combustion air to transport the vaporized fuel to the ignition source. Of course, if this method were used in a gaseous fuel engine, too much mixing of the gaseous fuel with the combustion chamber air would take place, and no stratification could be achieved.

As another example, if a liquid fuel were directed toward an ignition source without mixing with and being vaporized by the combustion chamber air, the wet liquid would cover the ignition source and the fuel would not ignite. As previously stated, the liquid fuel must first be vaporized before ignition can occur.

Because of the natural tendency of gases to diffuse, the gaseous fuel must be injected into the combustion chamber so as to reach the ignition source with minimal mixing of the gaseous fuel and the combustion chamber air. Only enough mixing should occur to provide enough air in the fuel/air mixture at the ignition source to support combustion.

Canadian Pat. No. 869,305 to Ward et al discloses a two cycle gaseous fuel engine with a large, non-directional, differential pressure operated gaseous fuel valve that depends solely on the scavaging air flow pattern for distribution of the fuel-air mixture in the combustion chamber at the time of ignition. Air flow from the inlet ports loops upwardly in aspirating flow across the chamber, allowing a check valve to open by differential pressure, which draws the gaseous fuel into the combustion chamber. The looping air flow draws the cloud of gaseous fuel downwardly along the wall of the cylinder above the exhaust port. Then when the piston moves upwardly, it compresses the air and gaseous fuel trapped in the cylinder and the fuel cloud moves upwardly toward a glow plug. It is believed that this type of system permits too much mixing of the air and gaseous fuel for optimum charge stratification. As long as the gaseous fuel is directed into the body of the combustion chamber air mass, too much mixing of the gaseous fuel with the air will occur.

SUMMARY OF THE INVENTION

By means of the present invention, there is provided a combustion system for use in gaseous fuel internal combustion engines that is substantially free of the disadvantages of the prior art. The stratified charge combustion system of the present invention includes a combustion chamber defined by the fixed inside surface of a cylindrical lining and the inside surfaces of opposed combustion chamber ends. At least one of the opposed ends is a piston positioned in the cylinder to move reciprocatingly along the longitudinal axis of the cylinder. An ignition source is mounted in the combustion chamber immediately adjacent a fixed inside surface. A gaseous fuel injection valve assembly is in communication with the combustion chamber and in spaced relationship from the ignition source with a portion of the inside surfaces extending between the valve assembly and the ignition source. The fuel valve assembly defines an entry port for the entrance of gaseous fuel. The entry port is recessed outside a fixed inside surface. The entry port is sized and shaped to inject gaseous fuel in an arc of about 180° or less around the axis of the fuel valve generally toward the ignition source.

A curved transitional surface extends from the entry port toward the portion of the inside surfaces extending between the fuel valve assembly and the ignition source. The curved transitional surface curves away from the direction of the entry port. Means are also provided for pressurizing the gaseous fuel prior to injection. The curved transitional surface has such a curvature and the entry port is directed so that upon opening of the fuel injection valve, the gaseous fuel passes through the entry port and strikes the curved transitional surface at such an angle and speed that the gaseous fuel flow attaches itself to and follows the curved transitional surface under the Coanda Effect and then aerodynamically clings to or attaches to and follows the portion of the inside surfaces extending between the injection valve assembly and the ignition source as the gaseous fuel flows to the ignition source.

The present invention thus provides for the first time a combustion system which produces a controlled stratified charge in a single combustion chamber of a gaseous fuel internal combustion engine. Therefore, the twin advantages of low fuel consumption and low pollutant emissions which have been obtained utilizing a stratified charge combustion system in liquid fuel internal combustion engines will now be available in gaseous fuel internal combustion engines. Such a stratified system can also provide more stable combustion and reduce maintenance.

In one embodiment of the invention, the stratified charge combustion system comprises a loop scavenged two-cycle system having air intake ports in one side of the cylindrical lining and exhaust ports in the opposite side of the cylindrical lining. One opposed end is a piston, and the other opposed end is a dome shaped cylinder head. The ignition source is centrally mounted in the cylinder head. The injection valve assembly is also mounted in the cylinder head on the air intake port side of the ignition source and at less than about 45° off of a line extending from the center of the intake ports to the ignition source.

Because the gaseous fuel follows the inside surface of the cylinder head, it is only minimally affected by air turbulence within the combustion chamber. More specifically, the portion of gaseous fuel flow nearest to the inside surface of the cylinder head will provide a much richer fuel/air ratio to the ignition source, and the portion of the gaseous fuel flow which is further from that surface will result in a much leaner fuel/air ratio. Thus, the limited diffusion of the gaseous fuel stream as it flows toward the ignition source, combined with the limited natural mixing of the combustion air and the gaseous fuel in the cylinder, produces a gradient of mixture strength which is very rich near the ignition source and very lean in those portions of the combustion chamber where there is no gaseous fuel flow.

In another embodiment of the invention, the combustion system comprises a uniflow scavenged two-cycle system with a plurality of intake ports in the bottom of the cylindrical lining. One opposed end is a piston and the other opposed end is a cylinder head. A plurality of exhaust valves are mounted in the cylinder head, and the ignition source is centrally mounted in the cylinder head. The fuel injection valve assembly is mounted in the cylinder head with some of the exhaust valves positioned between the ignition source and the valve assembly and is also aligned between two of the exhaust valves.

A method aspect of this invention relates to the manner of injecting a gaseous fuel into the combustion chamber of a gaseous fuel internal combustion engine. This is accomplished by injecting a gaseous fuel through an entry port at such an angle and speed so that it strikes a curved transitional surface and attaches to and follows the curved transitional surface under the Coanda Effect. The gaseous fuel then continues to follow an inside surface of the combustion chamber as the gaseous fuel flows to the ignition source.

Thus, two principles of fluid dynamics, aerodynamic flow and the Coanda Effect, are applied in the present invention to injection of a gaseous fuel in order to obtain a stratified charge. Under the Coanda Effect, a free jet of gaseous fluid will follow a surface even though the surface is curved away from the original jet direction. This phenomenon is utilized in the present invention as the gaseous fuel is injected through the entry port, strikes the curved transitional surface, and attaches to and follows the curved transitional surface even though that surface curves away from the original direction of the injected gaseous fuel. As the stream of fuel curves around the transitional surface, it produces a force directed radially outward, creating a suction at the surface which causes the stream to follow the curved surface. See Reba, "Applications of the Coanda Effect", Scientific American, Vol. 213 (1968).

After following the curved transitional surface, the gaseous fuel then aerodynamically clings or attaches to and follows an inside surface to the ignition source. During its flow to the ignition source, the gaseous fuel behaves under aerodynamic principles of clinging to an adjacent surface. Examples of this principle include the flow of air around a moving vehicle and an air jet in a room ventilation system tending to cling or adhere to the nearest wall. See Hucho, Janssen and Emmelmann, "The Optimization of Body Details—A Method for Reducing the Aerodynamic Drag of Road Vehicles," Society of Automotive Engineers Paper No. 760185; Jante, "Scavenging and Other Problems of Two-Stroke Cycle Spark-Ignition Engines," Society of Automotive Engineers Paper No. 680468.

Some of the more important features of the present invention have thus been summarized rather broadly in order that the detailed description thereof that follows may be better understood, and in order that the contribution to the art may be better appreciated. There are, of course, additional features of the invention that will be described hereinafter and which will also form the subject of the claims appended hereto.

BRIEF DESCRIPTION OF THE DRAWINGS

FIG. 1 is a vertical cross-sectional view of one embodiment of the gaseous fuel stratified charge combustion system of the present invention.

FIG. 2 is a detailed cutaway view of one embodiment of a gaseous fuel injection valve assembly for use in the present invention.

FIG. 3 is a cross-sectional view of the valve assembly of FIG. 2, taken along line 3—3.

FIG. 4 is a top view of the valve guide of the valve assembly of FIG. 2, taken along line 4—4.

FIG. 5 is a horizontal cross-sectional view of the combustion chamber of the embodiment of FIG. 1, taken along line 5—5.

FIG. 6 is a detailed cutaway view of an alternative gaseous fuel injection valve assembly of the present invention having a shrouded seat.

FIG. 7 is a detailed cutaway view of an alternative gaseous fuel injection valve assembly of the present invention having a capped seat.

FIG. 8 is a vertical cross-sectional view of the gaseous fuel stratified charge combustion system of the present system retrofitted into an existing engine.

FIG. 9 is a vertical cross-sectional view taken along line 9—9 of FIG. 8.

FIG. 10 is a vertical cross-sectional view of an alternative embodiment of the gaseous fuel stratified charge combustion system of the present invention.

FIG. 11 is a horizontal cross-sectional view of the alternative embodiment of FIG. 10, taken along line 11—11.

DESCRIPTION OF THE PREFERRED EMBODIMENT

Figure 13:
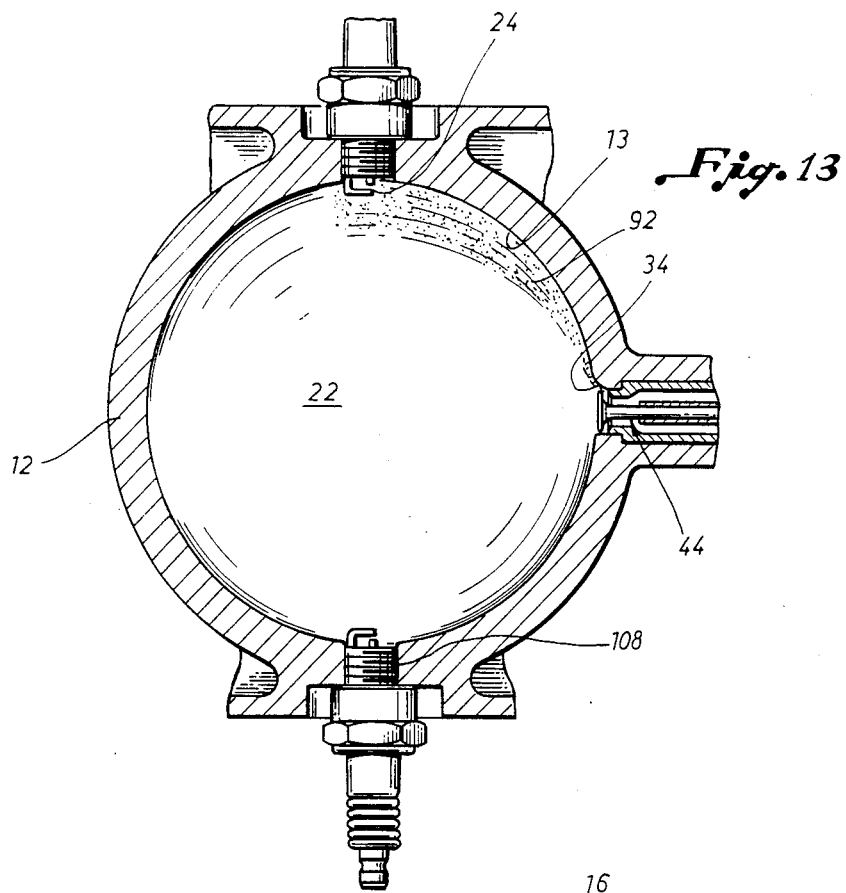
FIG. 13 is a horizontal cross-sectional view of the alternative embodiment of FIG. 12, taken along line 13—13.

Throughout the following description, similar reference numerals refer to similar elements in all figures of the drawings.

As used throughout this application, the term "gaseous fuel" is intended to include all elements, compounds, and mixtures thereof that exist substantially completely in the gaseous state under the conditions existing at the injection valve at the time of fuel injection. Such elements and compounds would include, but not be limited to, hydrogen, carbon monoxide, methane, ethane, propane, butane, and heavier hydrocarbon fuels.

Referring to FIG. 1, there is shown one embodiment of a gaseous fuel stratified charge combustion system 10 of the present invention incorporated into a loop scavenged two-cycle internal combustion engine. The stratified charge combustion system 10 comprises a cylindrical lining 12 having an inside surface 13, a piston 14 reciprocatingly positioned in cylindrical lining 12 and having a top surface 16, and a cylinder head 18 enclosing the end of cylindrical lining 12 and having a concave inside surface 20. Inside surface 13 of cylindrical lining 12, top surface 16 of piston 14, and concave inside surface 20 of cylinder head 18 define a combustion chamber 22. An ignition source 24 is centrally mounted in cylinder head 18 and communicates with combustion chamber 22. As shown, ignition source 24 is a spark plug, although either a pilot injection of liquid fuel oil ignited by the heat of compression or a precombustion chamber which utilizes its own fuel supply and ignition source could also be used. A fuel injection valve assembly 26 is mounted in cylinder head 18 adjacent cylindrical lining 12 and is in communication with combustion chamber 22.

Referring now to the detail sectional view of FIG. 2, one embodiment of gaseous fuel injection valve assembly 26 includes a valve cage 28 adapted for mounting in cylinder head 18 by inserting a cylindrical lower portion 30 of valve cage 28 into a cylindrical bore 32 that extends through cylinder head 18 and into combustion chamber 22. A curved and flared transitional surface 34 extends between bore 32 and inside surface 20 of cylinder head 18 to provide a surface for the injected gaseous fuel to follow, as will be explained in greater detail below. Anchoring means 35, such as the nut and bolt shown in FIG. 2, secures valve cage 28 to cylinder head 18.

A fuel intake passage 36 which extends through valve cage 28, has an entrance port 38 as its upstream end adapted to receive a gaseous fuel manifold 40. At the downstream end of intake pasage 36 is an inlet port 42 which opens into combustion chamber 22 and through which gaseous fuel flow into the combustion chamber is controlled by a valve 44. Inlet port 42 has a straight cylindrical wall portion 46 of circular cross-section that terminates at an annular valve seat 48 which is conventionally beveled at a suitable angle to the axis of inlet port 42.

Valve 44 includes a valve head 50 which is conventionally generally frustoconical in shape. Valve head 50 has a valve face 52 on one side which faces combustion chamber 22 and a valve back 54 on its opposite side. An annular valve seating portion 56 is formed on valve back 54 to cooperate with valve seat 48 whereby valve head 50 is adapted to engage tightly valve seat 48. Extending from and integral with valve back 54 is an elongated valve stem 58 which is concentric with the axis of valve head 50 and reciprocatingly positioned in a valve guide bore 60. Valve guide bore 60, which extends through valve cage 28 to inlet port 42, is coakial with the axis of inlet port 42. An upper portion 62 of valve stem 58 protrudes beyond valve guide bore 60. Projecting from valve back 54 is a valve shroud 64 concentric to the axis of valve 44 and extending around at least about 180° of the circumferential extent of valve head 50. This blocks off any gaseous fuel flow downwardly into the combustion chamber and away from ignition source 24.

As more clearly shown in FIG. 3, valve shroud 64 extends about 180° around valve head 50. Referring once again to FIG. 2, when valve 44 is in an open position, shroud 64, valve stem 58, valve back 54, and valve seat 48 cooperate to form a fuel flow entry port 66 from inlet port 42 into combustion chamber 22. Because it is desirable to direct the fuel first against the curved transitional surface as it leaves entry port 66, the entry port is recessed outside of inside surface 20 of the cylinder head. This recess should be anywhere from about ¼ inch to about 1 inch, depending on the lift of the valve in the injector assembly.

As best seen in FIGS. 2 and 4, gaseous fuel injection valve assembly 26 includes a valve guide 68 having a circular portion 70 and an arm portion 72 extending from circular portion 70. A cord-truncated circular hole 74 in circular portion 70 engages a guide portion 76 of upper portion 62 of valve stem 58, also of truncated circular cross-section, to align valve shroud 64 circumferentially away from ignition source 24. A threaded portion 78 of valve stem 58 extends above valve guide 68 and has a diameter smaller than that of guide portion 76 in order to pass freely through truncated circular hole 74 of valve 68.

Still referring to FIGS. 2 and 4, a valve guide retainer 80 is an angled plate having a horizontal leg 82 which is abutted against and secured to valve cage 28. Extending upward from horizontal leg 82 is a vertical leg 84 which is slotted at its upper end to form a yoke 86. Yoke 86 horizontally retains arm portion 72 of valve guide 68 and permits limited vertical movement of valve guide 68. That is, the bottom of yoke 86 defines a full open position of valve 44. As seen in FIG. 2, a coil spring 88 bears against circular portion 70 of valve guide 68 and against horizontal leg 82 of guide retainer 80 to bias valve 44 into the closed position (not shown). A nut 90 is threaded onto threaded portion 78 of valve stem 58 to retain coil spring 88 and valve guide 68.

Referring now to FIGS. 1 and 5, operation of this embodiment is shown at the time of fuel injection in a two cycle gaseous fuel internal combustion engine. Gaseous fuel injection is timed to begin near the closing of the exhaust ports (not shown) by piston 14 on the compression stroke. Injection of gaseous fuel is timed to end before compression pressure in combustion chamber 22 exceeds the gaseous fuel supply pressure.

First, valve 44 is opened to permit a gaseous fuel 92 under pressure to enter combustion chamber 22. As gaseous fuel 92 passes through fuel entry port 66, it strikes transitional surface 34 at an angle and speed such that gaseous fuel 92 attaches to and follows the contour of transitional surface 34 under the Coanda Effect even though the transitional surface curves away from the original direction of flow. The gaseous fuel then aerodynamically clings to and follows the inside surface 20 of cylinder head 18 as it flows to ignition source 24.

As shown in FIGS. 1 and 5, limited diffusion of gaseous fuel 92 occurs as it flows along inside surface 20. This limited diffusion, along with the limited natural mixing of gaseous fuel 92 with air in the combustion chamber, produces a gradient of fuel/air mixture strength. That is, the portion of gaseous fuel flow nearest to the inside surface 20 produces a richer fuel/air ratio, and the portion of the gaseous fuel flow remote from the inside surface 20 yields a leaner fuel/air ratio. During the remaining portion of the compression stroke and before ignition occurs, stratification of the fuel/air mixture will continue, producing in the area of ignition source 24 a pocket of rich fuel/air mixture suitable for easy, reliable and consistent ignition. At points in combustion chamber 22 distant from ignition source 24, the fuel/air mixture is leaner.

In a loop scavenged, two-cycle engine as shown in FIGS. 1 and 5, the scavenging air and combustion air flows into the chamber when the piston uncovers the intake ports (not shown). The air in a properly designed combustion chamber will flow upwardly from the intake ports to cylinder head inside surface 20, across the cylinder head inside surface, and then downwardly on the exhaust port side of cylindrical lining 12 and out the exhaust ports (not shown). Because of this flow pattern, it is preferred to have gaseous fuel injection valve assembly 26 on the intake side of inside surface 20 relative to ignition source 24 and about in alignment with the center line of the intake ports, as shown in FIGS. 1 and 5. However, injection valve assembly 26 can be located as much as about 45° away from this center line while still producing good ignition and good charge stratification. Also, valve assembly 26 should be positioned in the cylinder head at least about one-half the distance away from ignition source 24 toward cylindrical lining 12. This permits some minimal mixing of gaseous fuel with combustion chamber air which is necessary to support combustion. Also, this position permits the gaseous fuel flow to reach ignition source 24 at the right time for ignition.

Additionally, in the embodiment of FIG. 1, it is desirable that injection valve assembly 26 be mounted in the domed cylinder head 18 at an orientation which is anywhere between an alignment perpendicular to inside surface 20 and an angle of about 45° off of a perpendicular alignment tilted away from ignition source 24. As shown in FIG. 1, injection valve assembly 26 is tilted at an angle A from the perpendicular, away from the ignition source.

As best seen in FIG. 5, it is preferable that the center of the arc of gaseous fuel 92 should be about on a direct line extending between valve 44 and ignition source 24 for best ignition of the fuel/air mixture.

The angle of the fuel valve assembly 26 relative to transitional surface 34 and inside surface 20 and the angle of valve seat 48 should be such that the combined angle of the two will cause the flow of gaseous fuel 92 from entry port 66 to strike transitional surface 34 at the proper angle. It has been found that an appropriate range of valve seat angles is from about 15° to about 45°.

Preferably, the contour of transitional surface 34 at the point of impact of the injected gaseous fuel will be curved in such a radius that the combination of the angle of impact and the speed of the injected gaseous fuel will cause the gaseous fuel to cling to and follow the transitional surface 34 under the Coanda Effect and then aerodynamically cling to and follow inside surface 20 of cylinder head 18 to the ignition source 24.

The exact angle of impact of the gaseous fuel to curved transitional surface 34 is a highly variable factor which is dependent upon the curvature of curved transitional surface 34 and the speed of the injected gaseous fuel. This is similar to the range of angles of attack permitted on an aircraft wing. The permissible angles will vary before separation of the flow of air on top of the wing will occur, and are dependent upon the curvature of the leading edge of the wing. The exact angle of impact or range of angles of impact on transitional surface 34 can only be determined by physical testing together with empirical formulas, just as air foils are tested in actual wind tunnels. Thus, bench flow testing of the exact arrangement to be used is a necessary part of designing the stratified charge system of the present invention for a particular engine.

FIGS. 6 and 7 depict alternative directional valve designs that can be used in place of the shrouded valve shown in the embodiment of FIGS. 1, 2 and 3. In FIG. 6, a seat shroud 94 projects below valve seat 48 a distance greater than the maximum open position of valve 44. As shown, seat shroud 94 extends at least about 180° around the circumference of valve head 50. A capped seat configuration is illustrated in FIG. 7, in which a cap 96 encloses valve 44. An entry port in the form of an orifice 98 in cap 96 opens toward transitional surface 34 to induce proper flow of gaseous fuel 92. In both FIGS. 6 and 7, the entry port 66 and orifice 98 are both recessed outside surface 20. This recess permits gaseous fuel 92 to first strike and cling to and follow transitional surface 34 under the Coanda Effect before entering the combustion chamber.

Preferably, transitional surface 34 is fabricated into cylinder head 18 as shown in FIGS. 1 and 2. However, the stratified charge combustion system of the present invention will often be used as a retrofit in an existing engine. In such retrofits, it will frequently be the case that transitional surface 38 cannot be fabricated into the cylinder head. An alternative, therefore, is to fabricate transitional surface 34 into injection valve assembly 26 as shown in the embodiment of FIGS. 8 and 9.

FIGS. 8 and 9 show the stratified charge combustion system of the present invention as actually installed in a 10,000 HP Cooper-Bessemer Z-330 16 cylinder, two-cycle, natural gas fueled engine compressor unit on April 4, 1984. Note that the injection valve assembly 26 was installed at the top of cylindrical lining 12 and immediately adjacent cylinder head 18, a necessary limitation of this particular retrofit. For this particular installation, curved transitional survace 34 had a radius of $\frac{3}{8}$ inch, the valve seat angle was 30°, and the valve seat was recessed $\frac{5}{8}$ inch.

The operation of this unit was observed and monitored, with data being taken to compare the operation of the unit as equipped prior to installation of the stratified charge combustion system of the present invention and after the conversion. The following improvements in performance were observed:

Lower fuel consumption. A set of peak pressure cards was taken on Apr. 3, 1984 just prior to removal of the original Cooper-Bessemer fuel injection valves. These first cards showed a fuel flow orifice differential of 60 inches. A second set of peak pressure cards was taken on June 13, 1984 after the installation of the stratified charge combustion system of the present invention. The fuel flow orifice differential for this run was 57 inches. Both of these test runs were made at the same engine rpm and as close to the same torque conditions as possible. According to the station fuel orifice flow data sheet, the cubic feet per hour fuel flow at 60 inches is 72,500 and at 57 inches is 71,000, a difference of 2% in fuel flow. Accordingly, a fuel injection valve assembly constructed in accordance with the present invention produced a 2% improvement in fuel consumption in this particular installation.

More stable combustion. The April 3 and June 13 peak pressure cards were also analyzed for peak pressure variation from cycle to cycle for each cylinder and from one cylinder to another. On the peak pressure runs of Apr. 3, 1984, before removal of the original fuel valves, one cylinder designated "1R" showed a complete misfire and a high peak of 865 psi with an average peak pressure of approximately 700 psi. Cylinder "4R" showed an average cylinder pressure of approximately 750 psi with a high peak of 935 psi and a low peak of 600 psi. By contrast, the June 13, 1984 peak pressure cards after the modification, showed a marked improvement in cylinder balance and low cyclic pressure variations. The peak pressure did not exceed 900 psi on any of the cylinders, with the majority of the high peaks no higher than 850 psi. There were no misfires, and the lowest peak pressure on any of the cylinders was 600 psi.

Less maintenance. The modified Cooper-Bessemer engine continued to operate for a period of several months without any of the normal monthly maintenance required for such an engine. The reason for this is shown by a series of peak pressure cards which were taken at various time intervals after the engine modification was made. These peak pressure cards showed the continuation of good engine balance and low peak pressure cyclic variation.

Reduction of detonation. The engine was run with 6° before top dead center ignition timing with 107° F. air manifold temperatures. There was no detonation. The general sound of the engine and the feel on top of the engine gave no indication of any abnormal combustion. Prior to modification, a maximum of 5° before top dead center timing was the most timing advance without detonation at the existing operating conditions.

The foregoing improvements in engine performance should lead to substantial savings in engine operation, costs, maintenance costs, and engine life when compared to the unmodified conventional gaseous fuel engine.

Like the embodiment of FIG. 1, the entry port 66 in FIGS. 8 and 9 defined by the valve and valve seat is recessed from surface 20 of cylinder head 18 so that gaseous fuel 92 first strikes transitional surface 34 after injection. The amount of the recess depends upon the total lift of the valve, and will preferably fall between about $\frac{1}{4}$ inch and about 1 inch.

FIGS. 10 and 11 illustrate an alternative to the combustion chamber embodiment shown in FIG. 1. This design utilizes a cylinder head 18 having a substantially flat inside surface 20 with four valves 100, 102, 104 and 106 and a piston 14 having a Mexican hat-shaped top surface 16 or a flat top surface 16 (not shown). If valves 100, 102, 104 and 106 are exhaust valves with the system utilizing air intake ports (not shown) in cylindrical lining 12, the system is a uniflow scavenged two cycle combustion system. If, on the other hand, valves 100 and 102 are air intake valves and valves 104 and 106 are exhaust valves, the system is a four cycle combustion system. Gaseous fuel injection is timed to begin on the compression stroke near the closing of intake valves 100, 102 on the four cycle system and at or near the closing of exhaust valves 100, 102, 104 and 106 on the two cycle system. Ignition source 24 is centrally mounted on cylinder head 18, and injection valve assembly 26 is also mounted in cylinder head 18 adjacent the cylinder 12. As best seen in FIG. 11, injection valve assembly 26 has a shrouded seat which induces gaseous fuel 90 to flow in a rather narrow arc toward ignition source 24. This arc should be no more than about 180°. Of course, the entry port may be defined by either a shrouded valve, a shrouded seat, or a capped seat.

As shown, valve 44 is aligned between two of the exhaust valves 100, 102. Also, valve 44 is preferably mounted in cylinder head 18 at least about one-half the distance along inside surface 20 away from ignition source 24 to permit some minimal mixing of the fuel with the combustion chamber air and to permit gaseous fuel 92 to reach the ignition source at the proper time for ignition. In this case, fuel valve assembly 26 has been mounted at the outer periphery of cylinder head 18. For best operation, valve assembly 26 is aligned between a position perpendicular to the inside surface 20 of the cylinder head, as shown, and an angle of about 45° from the perpendicular in any direction. It is also preferable that the center of the arc of injected gaseous fuel 92 falls on a line extending to the ignition source as shown, although the center of the arc may fall off of this line as much as about 30° to either side.

Figure 12:
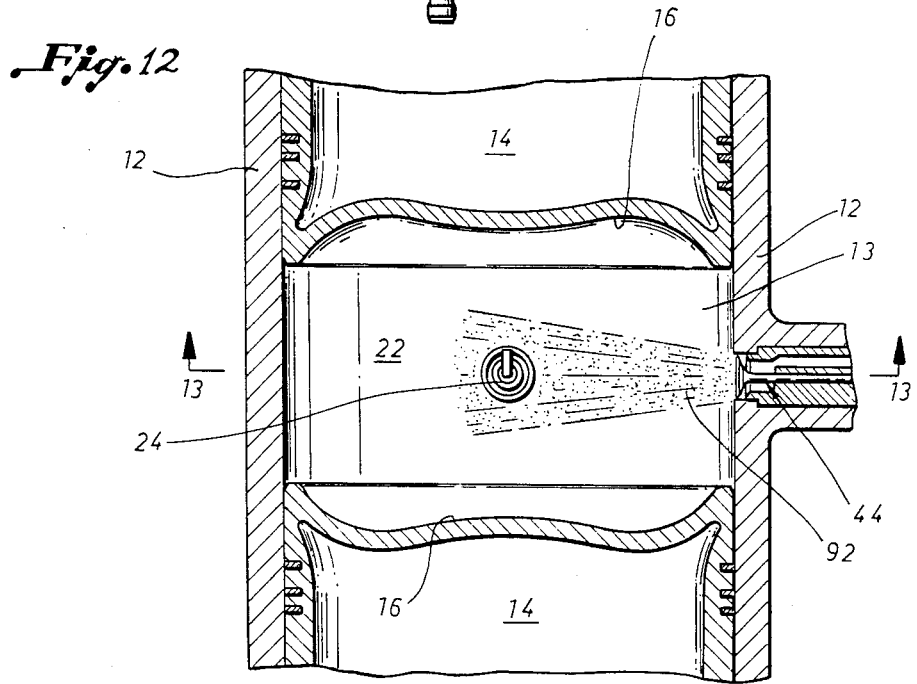
FIG. 12 is a vertical cross-sectional view of an alternative embodiment of the gaseous fuel stratified charge combustion system of the present invention having two opposed pistons.

FIGS. 12 and 13 illustrate another embodiment of the gaseous fuel stratified charge combustion system of the present invention having a pair of opposed pistons 14 operating on a two stroke cycle. Although pistons 14 as shown have Mexican hat top surfaces 16, a flat surface may also be used. Air inlet ports (not shown) are located in one end of cylindrical lining 12 and are opened and closed by one of the pistons 14, while air exhaust ports (not shown) are located in the opposite end of lining 12 and are operated by the other piston.

Fuel injection valve assembly 26 and ignition source 24 are mounted in cylindrical lining 12 an appropriate distance apart, here shown as approximately 90°. A redundant ignition source 108 may be present in this embodiment if an existing gaseous fuel internal combustion engine is retrofitted with a valve assembly 26 according to the present invention.

FIGS. 12 and 13 illustrate a flow stream in which gaseous fuel 92 is induced to first strike transitional surface 34 and cling to and follow it under the Coanda Effect, and then to aerodynamically cling to inside surface 13 of cylinder 12 as gaseous fuel 92 flows to the ignition source 24. Although the entry port illustrated in FIGS. 12 and 13 is defined by a shrouded seat, a shrouded valve or a capped seat could also be used.

The foregoing description has been directed to particular embodiments of the invention in accordance with the requirements of the patent statute for the purposes of illustration and explanation. It will be apparent, however, to those skilled in this art that many modifications and changes in the apparatus and procedures set forth will be possible without departing from the scope and spirit of the invention. It is intended that the following claims be interpreted to embrace all such modifications and changes.

I claim:

1. A stratified charge combustion system for use in a gaseous fuel internal combustion engine comprising:
   (a) a combustion chamber defined by the fixed inside surface of a cylindrical lining and the inside surfaces of opposed combustion chamber ends, at least one of the opposed ends being a piston positioned in the cylindrical lining to move reciprocatingly along the longitudinal axis of the lining;
   (b) an ignition source mounted in the combustion chamber immediately adjacent a fixed inside surface;
   (c) a gaseous fuel injection valve assembly in communication with the combustion chamber and in spaced relationship from the ignition source with a portion of the inside surfaces extending between the fuel injection valve assembly and the ignition source, the fuel valve assembly defining an entry port for the entrance of gaseous fuel, the entry port being recessed outside of a fixed inside surface, the entry port being sized and shaped to inject gaseous fuel in an arc of about 180° or less around the axis of the fuel valve generally toward the ignition source;
   (d) means for pressuring the gaseous fuel prior to injection; and
   (e) a curved transitional surface extending from the entry port toward the portion of the inside surfaces extending between the fuel injection valve assembly and the ignition source, the curved transitional surface curving away from the direction of the entry port, the curved transitional surface having a curvature for the particular direction and configuration of the entry port, for the particular configuration of the portion of the inside surfaces extending between the injection valve assembly and the ignition source, the particular arrangement of the fuel injection valve assembly in the combustion chamber, and for the particular pressure of the gaseous fuel to produce the Coanda Effect in the injected gaseous fuel flow after it passes through the entry port and follows the curved transitional surface under the Coanda Effect as the curved transitional surface curves away from the direction of the entry port, and also to produce a flow of the gaseous fuel that clings to and follows the particular configuration of the inside surfaces to the ignition source.

2. The stratified charge combustion system of claim 1, wherein the center of the arc of injected gaseous fuel falls about on a line extending from the injection valve assembly to the ignition source.

3. The stratified charge combustion system according to claim 1, wherein:
   (a) the combustion system comprises a loop scavenged two-cycle system having air intake ports in one side of the cylindrical lining and exhaust ports in the opposite side of the cylindrical lining;
   (b) one opposed end is a piston;
   (c) the other opposed end is a dome shaped cylinder head;
   (d) the ignition source is centrally mounted in the cylinder head; and
   (e) the fuel injection valve assembly is mounted in the cylinder head on the air intake port side of the ignition source and at less than about 45° off of a line extending from the center of the intake ports to the ignition source.

4. The stratified charge combustion system of claim 3, wherein:
   (a) the fuel injection valve assembly is mounted in the cylinder head at least about one half the distance along the inside surface of the cylinder head away from the ignition source; and
   (b) the center line of the injection valve assembly is aligned between a position perpendicular to the inside surface of the cylinder head and an angle of about 45° to the inside surface of the cylinder head with the injection valve assembly tilted away from the ignition source.

5. The stratified charge combustion system according to claim 1, wherein:
   (a) the combustion system comprises a uniflow scavenged two-cycle system with a plurality of intake ports in the bottom of the cylindrical lining;
   (b) one opposed end is a piston;
   (c) the other opposed end is a cylinder head, a plurality of exhaust valves being mounted in the cylinder head;
   (d) the ignition source is centrally mounted in the cylinder head; and
   (e) the fuel injection valve assembly is mounted in the cylinder head with some of the exhaust valves positioned between the ignition source and the injection valve assembly, the fuel injection valve assembly being aligned between two of the exhaust valves.

6. The stratified charge combustion system of claim 5, wherein:
   (a) the injection valve assembly is mounted in the cylinder head at least about one half the distance along the inside surface of the cylinder head away from the ignition source; and
   (b) the center line of the injection valve assembly is aligned between a position perpendicular to the inside surface of the cylinder head and an angle of about 45° from the perpendicular in any direction.

7. The stratified charge combustion system of claim 6, wherein the center of the arc of injected gaseous fuel falls anywhere between a position on a line extending to the ignition source and a position about 30° off of that line.

8. The stratified charge combustion system of claim 1, wherein:
   (a) the combustion system comprises a two stroke cycle;
   (b) each of the opposed ends is a piston;
   (c) the system has air inlet ports in one end of the cylindrical lining that are opened and closed by one piston and exhaust ports in the opposite end of the cylindrical lining that are opened and closed by the other piston;
   (d) the ignition source is mounted in the cylindrical lining between the pistons; and
   (e) the fuel injection valve assembly is mounted in the cylindrical lining generally in the same transverse plane as the ignition source.

9. The stratified charge combustion system of claim 1, 3, 5, or 8, wherein the entry port is defined by a shrouded valve and the valve seat.

10. The stratified charge combustion system of claim 9, wherein the valve seat angle is from about 15° to about 45°.

11. The stratified charge combustion system of claim 9, wherein the entry port is recessed between about ¼ inch and about 1 inch.

12. The stratified charge combustion system of claim 1, 3, 5, or 8, wherein the entry port is defined by a shrouded seat and the valve.

13. The stratified charge combustion system of claim 12, wherein the entry port is recessed between about ¼ inch and about 1 inch.

14. The stratified charge combustion system of claim 12, wherein the valve seat angle is from about 15° to about 45°.

15. The stratified charge combustion system of claim 1, 3, 5, or 8, wherein the entry port comprises at least one aperture in a cap of a capped valve seat.

16. The stratified charge combustion system of claim 1, wherein:
   (a) the combustion system comprises a four-cycle system;
   (b) one opposed end is a piston;
   (c) the other opposed end is a cylinder head;
   (d) a plurality of exhaust valves and intake valves are mounted in the cylinder head;
   (e) the ignition source is centrally mounted in the cylinder head; and
   (f) the fuel injection valve assembly is mounted in the cylinder head with the intake valves positioned between the ignition source and the injection valve assembly.

17. A method for producing stratified charge combustion in a gaseous fuel internal combustion engine, which has a combustion chamber defined by the fixed inside surface of a cylindrical lining and the inside surfaces of opposed combustion chamber ends, at least one of which is positioned in the cylindrical lining to move reciprocatingly along the longitudinal axis of the lining, an ignition source mounted in the combustion chamber immediately adjacent a fixed inside surface, and a gaseous fuel injection valve assembly in communication with the combustion chamber and in spaced relationship from the ignition source with a portion of the inside surfaces extending between the injection valve assembly and the ignition source, the fuel injection valve assembly defining an entry port, the method comprising the steps of:
   (a) pressurizing the gaseous fuel prior to injection;
   (b) providing a curved transitional surface that curves away from the direction of the entry port at a curvature for the particular direction and configuration of the entry port, for the particular configuration of the portion of the inside surfaces extending between the injection valve assembly and the ignition source, for the particular arrangement of the injection valve assembly in the combustion chamber, and for the particular pressure of the gaseous fuel;
   (c) injecting the pressurized gaseous fuel at such an angle and speed that the gaseous fuel strikes the transitional surface and clings to and follows the transitional surface under the Coanda Effect, and then aerodynamically clings to and follows the portion of the inside surfaces extending between the injection valve assembly and the ignition source as the gaseous fuel flows to the ignition source; and
   (d) igniting the air/fuel mixture adjacent the ignition source.

18. The method of claim 17, wherein the injected gaseous fuel is restricted to a flow arc of about 180° or less directed generally toward the ignition source.

19. The method of claim 18, wherein the center of the arc of injected gaseous fuel is directed about on a line extending from the injection valve assembly to the ignition source.

20. The method of claim 17, wherein the combustion system is a loop scavenged two-cycle system, the gaseous fuel is injected at or near the time of closing of the exhaust ports on the compression stroke, and injection ends before the combustion chamber pressure is higher than the fuel injection pressure.

21. The method of claim 17, wherein the combustion system is a uniflow scavenged two-cycle system and the gaseous fuel is injected at or near the closing of the exhaust valves.

22. The method of claim 17, wherein the combustion system is a four-cycle system and the gaseous fuel is injected on the compression stroke near the closing of the intake valves.

* * * * *